July 24, 1956 P. WEYNAND 2,755,539
AUTOMOBILE WHEEL TOOL
Filed Dec. 18, 1952 2 Sheets-Sheet 1
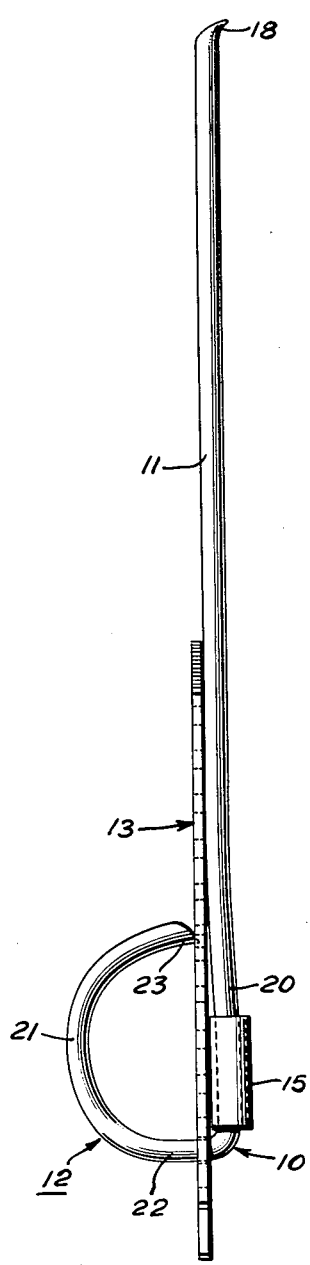
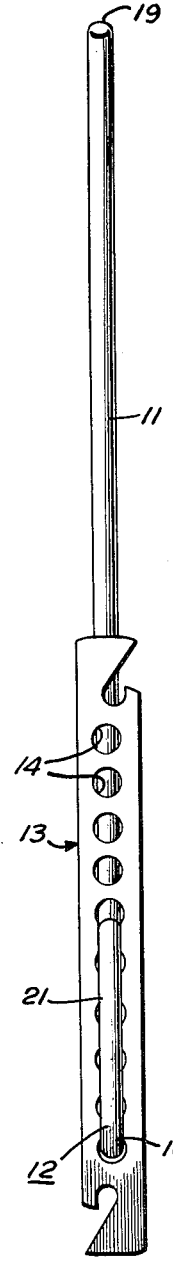
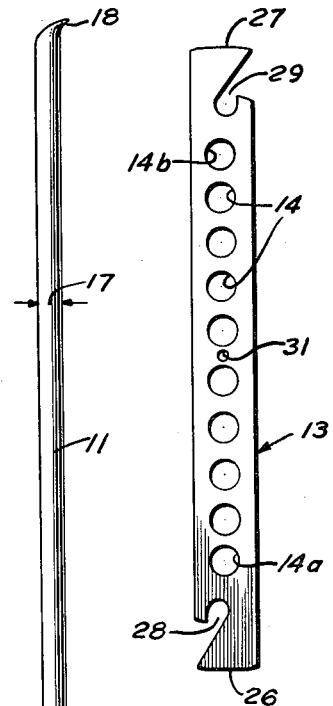
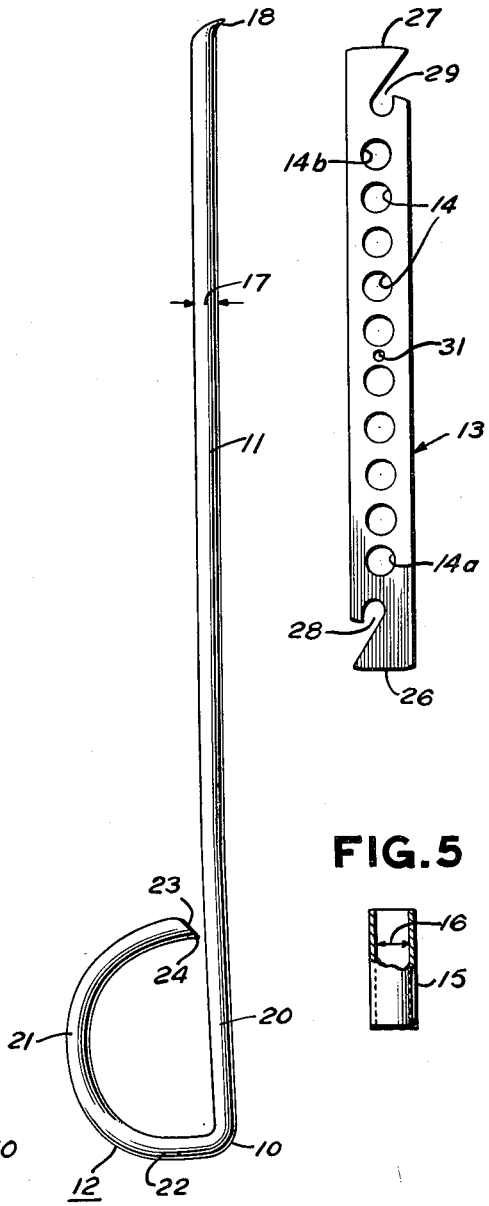
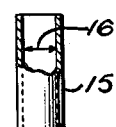
INVENTOR.
Paul Weynand
BY
Attorneys July 24, 1956 P. WEYNAND 2,755,539
AUTOMOBILE WHEEL TOOL
Filed Dec. 18, 1952 2 Sheets-Sheet 2

INVENTOR.
Paul Weynand
BY
Lancaster, Allwine & Rommel
Attorneys

United States Patent Office 2,755,539
Patented July 24, 1956

2,755,539
AUTOMOBILE WHEEL TOOL
Paul Weynand, San Antonio, Tex.

Application December 18, 1952, Serial No. 326,667

3 Claims. (Cl. 29—245)

This invention relates to combination tools of the character used in dismembering portions of automobile wheels of the demountable kind, embodying hub caps, in some instances dust caps on the hubs, and pneumatic tires on the rims, and for the purpose of replacing or assembling the wheel centers in secure relation to the usual hub back flanges.

The principal objects of the invention are to provide a tool of this character which is low in cost of manufacture, embodying but few parts, efficient in operation in the performance of several tasks incident to wire repairs, use of spare wheel units and lubrication jobs, and which may be compactly assembled and stored in very small compass in the tool kit or compartment of the automobile without likelihood of parts becoming lost.

Another object is to provide a tool of this character which has a very wide range of adjustment, so that it may be effectively used when performing work on the various makes and models of automobiles having different sizes of tire rims, contours of wheel centers, different sizes of hub caps and dust caps and different arrangements for securing the wheel centers to the hub back flanges, the tool being useful in removing hub and dust caps, as a tire tool, and for the purpose of aiding in lifting the wheel centers and parts carried thereby into proper relationship to the hub back flanges when mounting the wheel centers, such as of so-called "spare wheels," or after completing tire repairs, lubrication and adjustment of axles and bearings, etc.

Other objects and advantages of the invention will appear in the following detailed description of the preferred embodiment of the invention, taken in connection with the accompanying drawings, forming a part of this specification, and in which drawings:

Fig. 1 is a side view of the combination tool with parts assembled for non-use, a condition while the tool is being carried from place to place, or stored in a tool compartment.

Fig. 2 is a plan view of the same.

Fig. 3 is a side view of a prying or lifting rod forming a part of the tool.

Fig. 4 is a plan view of a fulcrum bar forming a part of the tool.

Fig. 5 is a view partly in elevation and partly in longitudinal section of a sleeve member forming part of the tool.

Figure 6:
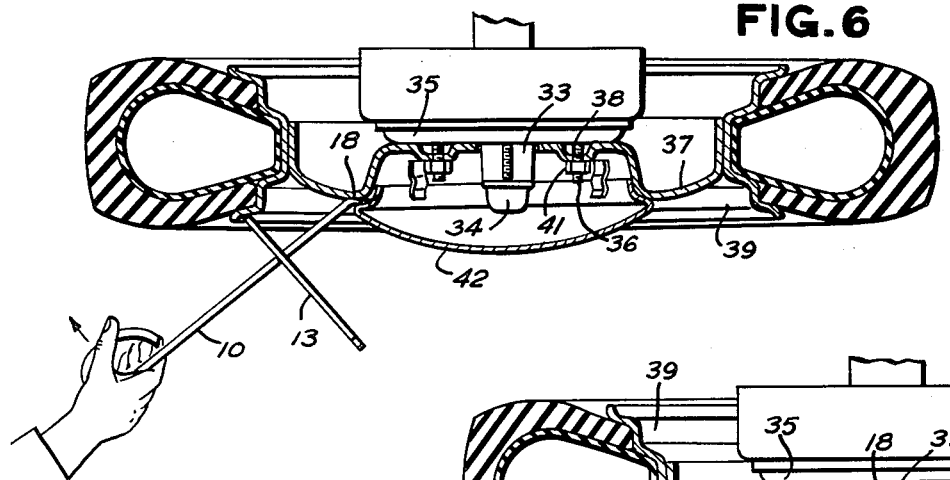
Fig. 6 is a view partly in horizontal section through a conventional automobile front wheel including a dust cap and a hub cap and showing use of the tool in removing the latter.
Figure 7:
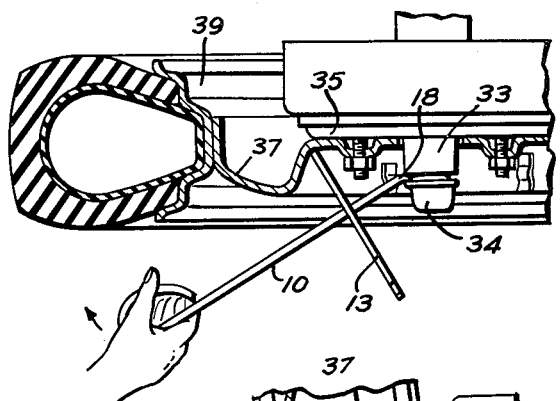
Fig. 7 is a similar view showing use of the tool in removing the dust cap.
Figure 8:
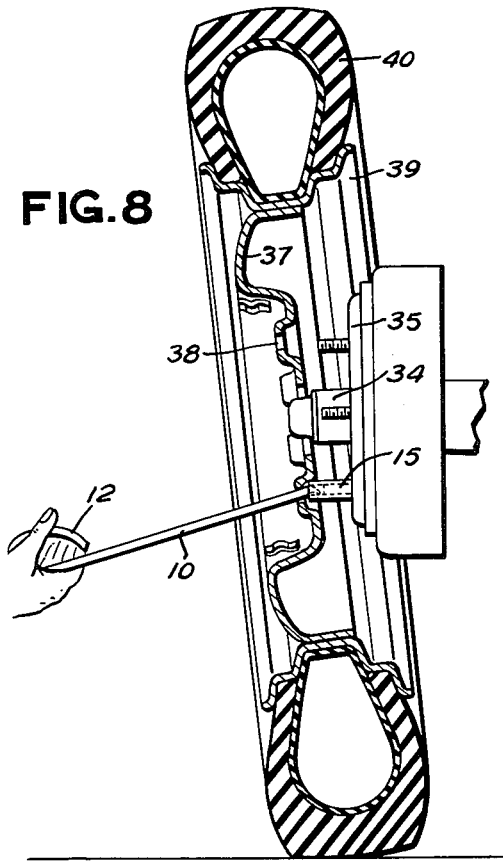
Fig. 8 is a vertical sectional view of a wheel center, rim and tire assembled in readiness to be mounted against a hub back flange of the type of wheel shown in Figs. 7 and 8, with the tool in readiness to lift the said assembly into proper relation to the hub back flange.

The wheel tool comprises a prying or lifting rod 10, preferably of strong but slightly springy material, including a relatively straight lever portion 11 and a handle 12 at one end thereof; an elongated fulcrum bar 13 provided with a series of holes 14 spaced apart longitudinally of the bar, through which the lever portion 11 may be selectively extended when using the tool for prying purposes, as shown in Figs. 6 and 7; and a sleeve member 15 having an internal diameter 16 appreciably greater than the diameter 17 of the rod 10, so that it may be slid along the rod, when not in use, but primarily intended as a fulcrum socket for the end of the lever portion 11 opposite handle 12 when used for lifting purposes as shown in Fig. 8.

It is preferred to offset the end of the lever portion 11 opposite handle 12, to provide a tapered lug 18 with rounded end 19 so as to permit use of the bar 10 as a tire tool, in the well known manner, and for purposes to be subsequently set forth.

The handle 12 is of open loop-shaped formation having a first reach 20 joined to the end of lever portion 11 opposite the end having the lug 18; a second reach 21 extending along, but spaced from the portion 21; and a bight portion 22 connecting the reaches 20 and 21. The terminal 23 of reach 21 is in slightly spaced relation to the lever portion 11 at its juncture with reach 20, as shown in Fig. 3, and I prefer to bevel the terminal 23, so that it is of tapered formation and has a rounded end 24, (similar to the rounded end of lug 18) confronting the lever portion 11.

With reference to the bar 13, I have found that in its use as a strut between portions of the wheel and the prying rod, and acting as a fulcrum, it is desirable to provide for various adjustments, because of differences in wheel diameters, hub cap diameters and even dust cap diameters, so the preferred form of bar 13 is provided with a great number of the holes 14, uniformly spaced apart along the bar, but by locating one of the end holes, such as that designated 14ª, nearer to the adjacent end 26 of the bar than the other end hole, such as that designated 14ᵇ, is located from the adjacent end 27 of the bar, the difference in spacing, being a fraction of an inch, the bar may be turned end for end, if a suitable hole in the bar, for the rod 11 is not found upon assembling the two members, to meet a particular job. By way of example, the hole 14ª, on center may be located 1³⁄₁₆" from end 26; hole 14ᵇ on center, 1½" from end 27; and all of the other holes 14 spaced ⅝" from each other and from the end holes. Thus if there are ten holes in the bar with such spacing, the rod 10 may be fulcrumed at twenty different distances from the abutment of the fulcrum bar, by utilizing all of the ten holes, one at a time with one end of the bar as the abutment end, and then turning the bar end for end and using the other end as an abutment and using all of the ten holes, one at a time. Although not essential, it is preferred to fabricate the bar inwardly of the end 26 with a notch 28 of the general character of that commonly provided for the removal of crown caps, and to fabricate the bar inwardly of the end 27 to provide a notch 29 suitable for perforating the top of an oil can or the like for pouring liquid therefrom and to permit entrance of air to displace the outflowing liquid.

An important feature of the invention is to so dimension and shape the parts 10 and 13 and characteristics thereof that, when not in use they may be compactly coupled together as shown in Figs. 1 and 2. Thus the bar 13 is preferably made of a thickness such that it is necessary to use some force in order to pass it between the terminal 23 of the handle and the lever portion 11, so as to spring the reach 21 of the handle outwardly, until the terminal 23 may spring partly into one of the end holes, either 14ª or 14ᵇ. Upon completion of this relationship of parts, the bar may be threaded along the reach 21 and onto the bight portion 22, whereupon the bar may be swung to a position clamped between the terminal 23 and the lever portion 11 as shown in Figs. 1 and 2. It is preferred to provide the bar with a relatively small intermediate hole 31 midway between the end holes 14ª and 14ᵇ, and to locate the rounded end 24 of terminal 23 so that the span between the terminal end 24 and the bight portion is equal to the distance between either of the end holes 14ª, 14ᵇ and the hole 31. This hole 31 provides a recess into which the terminal 23 will spring when the bar is thus threaded on the rod and extends longitudinally of the same.

Before thus disposing the bar 13 in compact position with respect to the rod 10, the sleeve 15 may be threaded on the rod and located on the reach 20 of handle 12, as shown in Figs. 1 and 2 where it is releasably retained from slipping off, by the bar 13.

In Figs. 6 and 7 is disclosed a conventional automobile wheel comprising a hub 33 including a detachable dust cap 34 and a hub back flange 35 providing with a plurality of outwardly projecting threaded lugs 36; a disk wheel center 37 provided with openings 38 through which the lugs 36 extend when the wheel center is in place; a rim 39 supporting a conventional tire 40; nuts 41 on the lugs 36 retaining the wheel center in place; and a hub cap 42 of the usual type latched or otherwise detachably secured to the wheel center in any conventional manner.

In use of the tool for removal of the hub cap 42, the bar 13 may be disposed in end abutting relation to the rim 39, and the lever portion 11, of rod 10 passed through a selected hole 14 in the bar and extended until the lug 18 of the lever portion 11 engages between the rim of the hub cap and the wheel center as shown in Fig. 6. Then by forcing the rod so that its handle moves toward the tire 40, the hub cap may readily be pried off the wheel center.

A similar procedure is followed to pry off the dust cap 34 as shown in Fig. 7, where the bar 13 is in end engagement with the wheel center 37.

In Fig. 8, the rod 10 and sleeve member 15 are shown in use for lifting the disk wheel center 37 with its rim 39 and tire 40 into proper relationship to the threaded lugs 36 and back flange 35. As shown, the sleeve member 15 is disposed on and extends beyond the end of the lowermost lug 36 providing a socket for that end of the lifting rod 10 provided with the lug 18. Before disposing the lug in the socket formed by the extending portion of sleeve member 15, the lever portion 11 of rod 10 is passed through the lowermost opening 38 in the wheel center. When in place, a lifting action as by grasping handle 12 and moving it upwardly, will lift the wheel to a position where it may be forced against the back flange 35 with the lugs 36 extending through the openings 38. Then, upon turning "home" the nuts 41, shown in Figs. 6 and 7, the assembly is accomplished with ease and dispatch.

Figure 9:
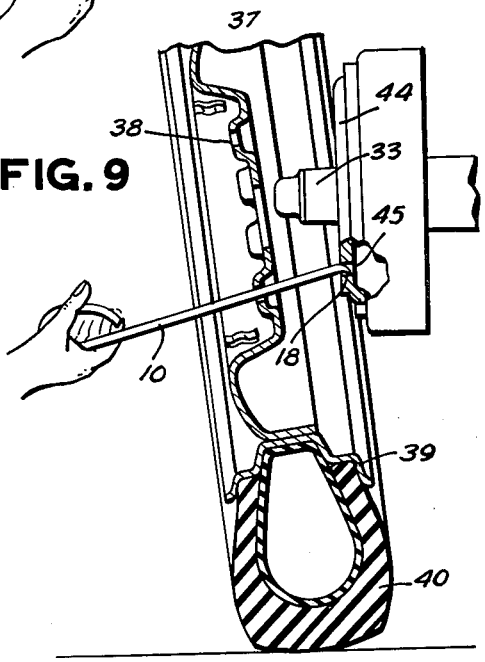
Fig. 9 is a view similar to Fig. 8, but showing the tool in use with a different type of detachable retaining means of the wheel center and hub back flange.

In Fig. 9 the tool is shown in use with another conventional type of wheel mounting and wherein the parts are substantially the same as in Figs. 6 and 7, except that the hub back flange 44 is provided with screw threaded openings 45 instead of the threaded lugs 36, these openings 45 for the reception of the shanks of bolts, not shown in the drawing, but which are well known in the art. In the use of the tool under such circumstances, the sleeve member 15 is dispensed with and after passing the lever portion 11 of rod 10 extending through the lowermost opening 38 of the wheel center 37, it is moved so that the lug 18 on the end of the lever portion 11 is engaged in the lowermost opening 45 of the hub flange. By rounding the end 19 of lug 18 I guard against mutilating the thread in opening 38. The procedure in lifting and forcing the wheel center 37 into place in engagement with the hub flange 35 is substantially the same as described in connection with Fig. 8.

I am aware that it is old in the art to provide combination tools which may be put to a plurality of uses such as a tool to facilitate removal of hub and dust caps, a tool to facilitate placing of wheel centers of the demountable wheel type in relation to hub back flanges, and a tire tool having a chisel-like end portion on a rod. However the present invention embodies parts for all these purposes and is mainly one which may be compactly assembled when not in use to guard against loss of parts when transporting same and especially loss in tool compartments of automobiles where vibration incident to travel is likely to dismember other types of tool assemblies.

I claim:

1. In a combination tool for prying hub and dust caps from normal positions on automobile wheels, rod comprising an elongated, relatively straight lever portion and an open loop-shaped handle having a first reach joined to one end of the lever portion, a second reach extending along but spaced from said first reach and a bight portion connecting said first and second reaches, with the terminal of said second reach closely adjacent to but spaced a predetermined distance from said lever portion at its juncture with said first reach, and an elongated fulcrum bar of a thickness slightly greater than said predetermined distance, and of a length greater than the span between said bight portion and said terminal of said second reach, said fulcrum bar provided with a series of holes spaced apart longitudinally thereof, through which the lever portion of said rod may be selectively extended when the tool is used for prying purposes and through an end hole of which said bight portion of the handle may extend with the bar clamped between said terminal of the second reach of the handle portion and the lever portion, when the tool is not assembled for use.

2. The combination tool as specified in claim 1 in which the fulcrum bar is provided with a recess located midway between the end holes of said series of holes and at a distance therefrom equal to the span between the bight portion and the terminal end of the second reach of said handle, said recess receiving said terminal portion when the tool is not assembled for use.

3. The combination tool as specified in claim 2 in which the recess is provided by a hole open to both faces of the fulcrum bar.

References Cited in the file of this patent

UNITED STATES PATENTS

| | | |
|---|---|---|
| 1,467,914 | Balcom | Sept. 11, 1923 |
| 1,494,269 | Meyers | May 13, 1924 |
| 2,276,105 | Shiells | Mar. 10, 1942 |
| 2,620,556 | Gaubert | Dec. 9, 1952 |
| 2,629,584 | Cannon | Feb. 24, 1953 |

OTHER REFERENCES

"Bear" Hub Cap Remover, Popular Science, January 1948, page 250.